J. H. HOBBS.
Glass Chandelier Trimmings.

No. 199,066. Patented Jan. 8, 1878.

Witnesses.
Francis L. Clark
Claudius L. Parker

Inventor John H. Hobbs.
By Attorney George H. Christy.

UNITED STATES PATENT OFFICE.

JOHN H. HOBBS, OF WHEELING, WEST VIRGINIA.

IMPROVEMENT IN GLASS CHANDELIER-TRIMMINGS.

Specification forming part of Letters Patent No. 199,066, dated January 8, 1878; application filed November 8, 1876.

*To all whom it may concern:*

Be it known that I, JOHN H. HOBBS, of Wheeling, county of Ohio, State of West Virginia, have invented or discovered a new and useful Improvement in Manufacture of Blown-Glass Chandelier-Trimmings; and I do hereby declare the following to be a full, clear, concise, and exact description thereof, reference being had to the accompanying drawings, making a part of this specification, in which—like letters indicating like parts—

Figure 1:
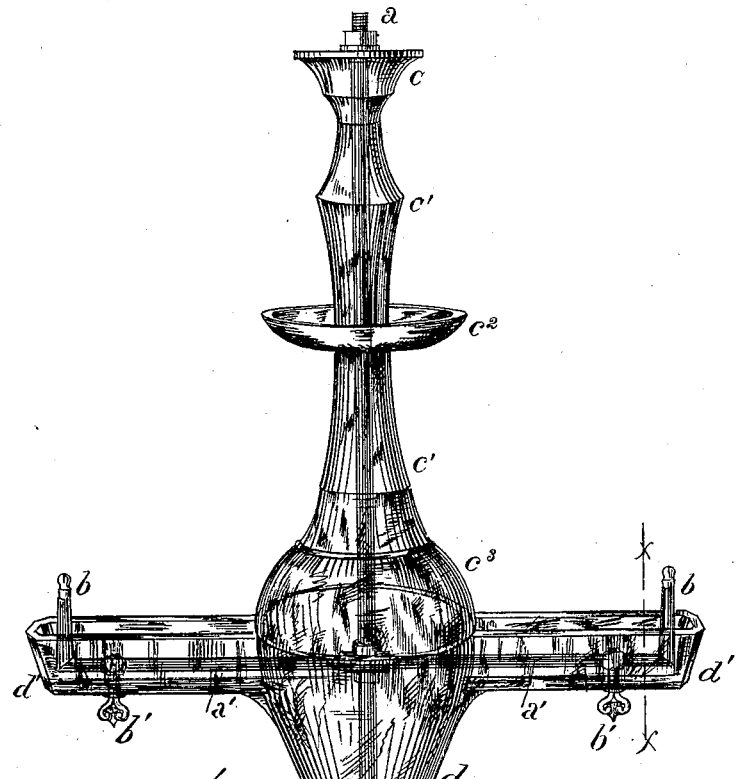
Figure 2:
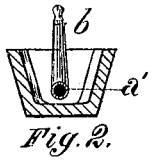

Figure 1 is a perspective view of a glass chandelier having a blown base, such as is contemplated by my present improvement. Fig. 2 is a transverse section through $x\ x$ of Fig. 1; and Fig. 3 is a vertical sectional view of a mold such as I employ in blowing the chandelier-base of Fig. 1, and illustrative of the operation of blowing.

The stem $a$ may represent the gas-conduit of a gas-chandelier, or the supporting-stem of a lamp-chandelier. In chandeliers the radial rods or pipes $a'$ are employed in any desired number, and of any desired form, with burner-tips $b$ (or suitable lamp-holders instead) and gas-cocks $b'$. The upper sections of the glass covering, case, or trimming $c\ c'\ c^2\ c^3$ are made in any desired way, they being particularly included in another application.

Figure 3:
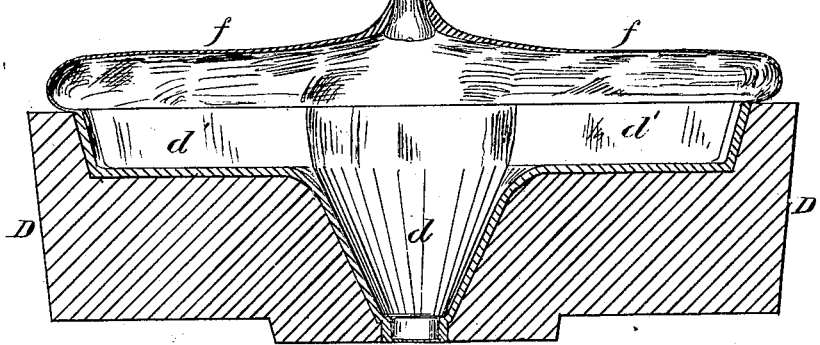

The lower section or base $d\ d'$ is made by blowing in a mold, D, having suitable cavities, substantially as shown in Fig. 3, for the blowing therein and shaping of the center piece $d$ and radial arms $d'$, the latter being two or more in number, and each having a U form in cross-section, as shown in Fig. 2, or other suitable form, such that they may be applied to the pipes $a'$ from below, and constitute a case or covering on the exposed lower and lateral sides.

The blowing is done, in the usual way, by gathering the proper quantity of molten glass on the end of the blow-pipe $e$, and blowing in the manner ordinarily practiced in the art, the usual blow-over (represented at $f$) being afterward removed. Holes for the attachment of the cocks $b'$ may be made in any known way. The bottom, at $s$, may be blown thin, so as to be broken, or may be otherwise removed, or perforated, or may be blown through, in order that, by a stem, $h$, projecting through, and a nut, $h'$, screwed thereon, or by other equivalent means, the base-piece so produced can be attached and form part of the chandelier.

The cavities in the mold may have any desired ornamentation on their faces, such as may be desired in the finished product; and the form of the cavities may be varied at pleasure, provided only they be adapted to produce an enlarged center piece, $d$, suitable for the purpose, and radial arms $d'$, of proper form to constitute an ornamental case or covering to the arms $a'$, whether the latter be straight or curved.

The invention herein described and claimed is, in fact, a further improvement in the class of molds referred to in Letters Patent No. 182,073, granted to me September 12, 1876. The mold therein described was intended solely for pressing; the mold described in the present specification is intended solely for blowing, and no claim is made herein for anything described in said Patent No. 182,073.

I claim as my invention—

The mode of making open-topped glass trimmings for chandeliers, by blowing the same to shape in an open-topped mold, D, provided with one central and two or more radial cavities, substantially as set forth.

In testimony whereof I have hereunto set my hand.

JOHN H. HOBBS.

Witnesses:
CHAS. N. BRADY,
LUCIEN B. MARTIN.